US012228044B1

(12) United States Patent
Thomas et al.

(10) Patent No.: US 12,228,044 B1
(45) Date of Patent: Feb. 18, 2025

(54) TURBINE SHROUD SYSTEM WITH CERAMIC MATRIX COMPOSITE SEGMENTS AND DUAL INTER-SEGMENT SEALS

(71) Applicants: Rolls-Royce Corporation, Indianapolis, IN (US); Rolls-Royce plc, London (GB)

(72) Inventors: David J. Thomas, Indianapolis, IN (US); Ted J. Freeman, Indianapolis, IN (US); Aaron D. Sippel, Indianapolis, IN (US); Clark J. Snyder, Indianapolis, IN (US); Steven Hillier, London (GB)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

(21) Appl. No.: 18/755,463

(22) Filed: Jun. 26, 2024

(51) Int. Cl.
*F01D 11/08* (2006.01)
*F01D 25/24* (2006.01)

(52) U.S. Cl.
CPC .............. *F01D 25/24* (2013.01); *F01D 11/08* (2013.01); *F05D 2230/60* (2013.01); *F05D 2240/55* (2013.01)

(58) Field of Classification Search
CPC ........ F01D 25/24; F01D 11/08; F01D 11/005; F01D 25/28; F01D 25/246; F05D 2240/55; F05D 2240/11; F05D 2240/57
See application file for complete search history.

(56) References Cited

U.S. PATENT DOCUMENTS 7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 * 4/2014 Martin .................. F01D 25/246 415/173.1
8,784,041 B2 7/2014 Durocher et al.
8,845,285 B2 9/2014 Weber et al.
8,905,708 B2 12/2014 Weber et al.
9,079,245 B2 7/2015 Durocher et al.
(Continued)

FOREIGN PATENT DOCUMENTS

EP 1965031 A2 9/2008
EP 3543468 A1 9/2019
FR 3056636 A1 3/2018

*Primary Examiner* — Eldon T Brockman
(74) *Attorney, Agent, or Firm* — Barnes & Thornburg LLP

(57) ABSTRACT

A turbine shroud assembly includes a first shroud segment, a second shroud segment, and a plurality of seals. The first shroud segment includes a first carrier segment and a first blade track segment having a first shroud wall. The second shroud segment includes a second carrier segment and a second blade track. The plurality of seals extend circumferentially into the first shroud segment and the second shroud segment to block gases from escaping the gas path radially between the first shroud segment and the second shroud segment.

20 Claims, 8 Drawing Sheets

(56) References Cited

U.S. PATENT DOCUMENTS

| | | | | |
|---|---|---|---|---|
| 9,534,500 | B2 | 1/2017 | Bouchard et al. | |
| 9,708,922 | B1 | 7/2017 | Davis et al. | |
| 9,714,580 | B2 | 7/2017 | Slavens et al. | |
| 9,745,854 | B2 | 8/2017 | Baldiga et al. | |
| 9,759,079 | B2 | 9/2017 | Sippel et al. | |
| 9,863,265 | B2 | 1/2018 | Stapleton | |
| 9,863,323 | B2 | 1/2018 | Kirtley et al. | |
| 9,869,201 | B2 | 1/2018 | Dyson et al. | |
| 9,874,104 | B2 | 1/2018 | Shapiro | |
| 9,915,162 | B2 | 3/2018 | Duguay | |
| 9,945,484 | B2 | 4/2018 | Moehrle et al. | |
| 9,957,827 | B2 | 5/2018 | Davis et al. | |
| 9,982,550 | B2 | 5/2018 | Davis | |
| 9,988,919 | B2 | 6/2018 | Davis et al. | |
| 9,988,923 | B2 | 6/2018 | Snyder et al. | |
| 10,012,099 | B2 | 7/2018 | Cetel et al. | |
| 10,024,193 | B2 | 7/2018 | Shapiro | |
| 10,072,517 | B2 | 9/2018 | Boeke et al. | |
| 10,082,085 | B2 | 9/2018 | Thomas et al. | |
| 10,087,771 | B2 | 10/2018 | Mcgarrah | |
| 10,100,660 | B2 | 10/2018 | Sippel et al. | |
| 10,132,197 | B2 | 11/2018 | Heitman et al. | |
| 10,138,747 | B2 | 11/2018 | Dev et al. | |
| 10,138,750 | B2 | 11/2018 | Mccaffrey et al. | |
| 10,167,957 | B2 | 1/2019 | Davis et al. | |
| 10,202,863 | B2 | 2/2019 | Davis et al. | |
| 10,265,806 | B2 | 4/2019 | Cui et al. | |
| 10,281,045 | B2 | 5/2019 | Sippel et al. | |
| 10,301,955 | B2 | 5/2019 | Vetters et al. | |
| 10,301,960 | B2 | 5/2019 | Stapleton et al. | |
| 10,378,385 | B2 | 8/2019 | Tesson et al. | |
| 10,378,386 | B2 | 8/2019 | Roussille et al. | |
| 10,415,426 | B2 | 9/2019 | Quennehen et al. | |
| 10,415,427 | B2 | 9/2019 | Quennehen et al. | |
| 10,422,241 | B2 | 9/2019 | Mccaffrey et al. | |
| 10,428,688 | B2 | 10/2019 | Quennehen et al. | |
| 10,428,953 | B2 | 10/2019 | Lutjen et al. | |
| 10,443,419 | B2 | 10/2019 | Thomas et al. | |
| 10,443,420 | B2 | 10/2019 | Sippel et al. | |
| 10,465,545 | B2 | 11/2019 | Cetel et al. | |
| 10,533,446 | B2 | 1/2020 | Barak et al. | |
| 10,550,706 | B2 | 2/2020 | Lutjen et al. | |
| 10,577,963 | B2 | 3/2020 | Mccaffrey | |
| 10,577,977 | B2 | 3/2020 | Baucco | |
| 10,584,605 | B2 | 3/2020 | Sippel et al. | |
| 10,590,803 | B2 | 3/2020 | Quennehen et al. | |
| 10,598,045 | B2 | 3/2020 | Tableau et al. | |
| 10,605,120 | B2 | 3/2020 | Quennehen et al. | |
| 10,619,517 | B2 | 4/2020 | Quennehen et al. | |
| 10,626,745 | B2 | 4/2020 | Roussille et al. | |
| 10,633,994 | B2 * | 4/2020 | Barker | F01D 11/005 |
| 10,648,362 | B2 | 5/2020 | Groves, II et al. | |
| 10,655,495 | B2 | 5/2020 | Groves, II et al. | |
| 10,655,501 | B2 | 5/2020 | Lepretre et al. | |
| 10,662,794 | B2 | 5/2020 | Das | |
| 10,677,084 | B2 * | 6/2020 | Smoke | F01D 11/005 |
| 10,689,998 | B2 | 6/2020 | Stapleton et al. | |
| 10,690,007 | B2 | 6/2020 | Quennehen et al. | |
| 10,704,404 | B2 | 7/2020 | Shi et al. | |
| 10,718,226 | B2 | 7/2020 | Vetters et al. | |
| 10,724,399 | B2 | 7/2020 | Carlin et al. | |
| 10,731,494 | B2 | 8/2020 | Dev et al. | |
| 10,731,509 | B2 | 8/2020 | Correia et al. | |
| 10,738,643 | B2 | 8/2020 | Mccaffrey et al. | |
| 10,753,221 | B2 | 8/2020 | Barker et al. | |
| 10,787,924 | B2 * | 9/2020 | Quennehen | F16J 15/447 |
| 10,794,204 | B2 | 10/2020 | Fitzpatrick et al. | |
| 10,801,345 | B2 | 10/2020 | Clum et al. | |
| 10,801,349 | B2 | 10/2020 | Mccaffrey | |
| 10,815,807 | B2 | 10/2020 | Vantassel et al. | |
| 10,815,810 | B2 | 10/2020 | Barker et al. | |
| 10,830,357 | B2 | 11/2020 | Mccaffrey et al. | |
| 10,890,079 | B2 | 1/2021 | Propheter-Hinckley et al. | |
| 10,907,487 | B2 | 2/2021 | Zurmehly et al. | |
| 10,907,501 | B2 | 2/2021 | Filippi et al. | |
| 10,934,872 | B2 | 3/2021 | Tableau et al. | |
| 10,934,873 | B2 | 3/2021 | Sarawate et al. | |
| 10,968,761 | B2 | 4/2021 | Barker et al. | |
| 10,968,777 | B2 | 4/2021 | Propheter-Hinckley et al. | |
| 10,982,559 | B2 | 4/2021 | Filippi | |
| 11,002,144 | B2 | 5/2021 | Azad et al. | |
| 11,015,613 | B2 | 5/2021 | Kerns et al. | |
| 11,021,988 | B2 | 6/2021 | Tableau et al. | |
| 11,021,990 | B2 | 6/2021 | Filippi | |
| 11,028,720 | B2 | 6/2021 | Tableau et al. | |
| 11,041,399 | B2 | 6/2021 | Lutjen et al. | |
| 11,047,245 | B2 | 6/2021 | Mccaffrey | |
| 11,066,947 | B2 | 7/2021 | Sippel et al. | |
| 11,073,045 | B2 | 7/2021 | Sippel et al. | |
| 11,078,804 | B2 | 8/2021 | Tableau et al. | |
| 11,085,316 | B2 | 8/2021 | Barker et al. | |
| 11,085,317 | B2 | 8/2021 | Johnson et al. | |
| 11,105,215 | B2 | 8/2021 | Roy Thill et al. | |
| 11,111,794 | B2 | 9/2021 | Bitzko et al. | |
| 11,111,802 | B2 | 9/2021 | Propheter-Hinckley et al. | |
| 11,111,822 | B2 | 9/2021 | Tableau et al. | |
| 11,111,823 | B2 | 9/2021 | Jarrossay et al. | |
| 11,125,096 | B2 | 9/2021 | Clark et al. | |
| 11,125,098 | B2 | 9/2021 | Barker et al. | |
| 11,143,050 | B2 | 10/2021 | Roy Thill et al. | |
| 11,149,574 | B2 * | 10/2021 | Laroche | F01D 11/008 |
| 11,174,747 | B2 | 11/2021 | Roy Thill et al. | |
| 11,174,795 | B2 | 11/2021 | Lutjen et al. | |
| 11,181,006 | B2 | 11/2021 | Smoke et al. | |
| 11,187,094 | B2 | 11/2021 | Feldmann et al. | |
| 11,215,064 | B2 | 1/2022 | Arbona et al. | |
| 11,215,065 | B2 | 1/2022 | Starr et al. | |
| 11,215,081 | B2 | 1/2022 | Schilling et al. | |
| 11,220,925 | B2 * | 1/2022 | Freeman | F01D 11/08 |
| 11,248,480 | B2 | 2/2022 | Thirumalai et al. | |
| 11,255,208 | B2 | 2/2022 | Clark et al. | |
| 11,255,209 | B2 | 2/2022 | Clark et al. | |
| 11,286,812 | B1 | 3/2022 | Freeman et al. | |
| 11,313,242 | B2 | 4/2022 | Cetel et al. | |
| 11,319,827 | B2 | 5/2022 | Clark et al. | |
| 11,319,828 | B1 | 5/2022 | Freeman et al. | |
| 11,326,463 | B2 | 5/2022 | Blaney et al. | |
| 11,326,470 | B2 | 5/2022 | Dyson et al. | |
| 11,346,237 | B1 | 5/2022 | Freeman et al. | |
| 11,346,251 | B1 | 5/2022 | Freeman et al. | |
| 11,365,635 | B2 | 6/2022 | Read et al. | |
| 11,441,434 | B2 | 9/2022 | Danis et al. | |
| 11,441,441 | B1 | 9/2022 | Freeman et al. | |
| 11,466,585 | B2 | 10/2022 | Arbona et al. | |
| 11,466,586 | B2 | 10/2022 | Sippel et al. | |
| 11,499,444 | B1 | 11/2022 | Freeman et al. | |
| 11,506,085 | B2 | 11/2022 | Jarrossay et al. | |
| 11,542,825 | B2 | 1/2023 | Hauswirth et al. | |
| 11,542,827 | B2 | 1/2023 | Quennehen et al. | |
| 11,624,291 | B2 | 4/2023 | Roy Thill et al. | |
| 11,624,292 | B2 | 4/2023 | Clark et al. | |
| 11,629,607 | B2 | 4/2023 | Freeman et al. | |
| 11,643,939 | B2 | 5/2023 | Stoyanov et al. | |
| 11,702,948 | B2 | 7/2023 | Hock et al. | |
| 11,702,949 | B2 | 7/2023 | Freeman et al. | |
| 11,713,694 | B1 | 8/2023 | Freeman et al. | |
| 11,732,604 | B1 | 8/2023 | Freeman et al. | |
| 11,761,351 | B2 | 9/2023 | Freeman et al. | |
| 11,773,751 | B1 | 10/2023 | Freeman et al. | |
| 11,781,440 | B2 | 10/2023 | Vincent et al. | |
| 11,781,448 | B1 | 10/2023 | Holleran | |
| 11,840,930 | B2 | 12/2023 | Propheter-Hinckley et al. | |
| 11,840,936 | B1 | 12/2023 | Freeman et al. | |
| 11,879,349 | B2 | 1/2024 | Schilling et al. | |
| 11,927,115 | B2 * | 3/2024 | Johansson | F01D 9/065 |
| 2019/0153886 | A1 * | 5/2019 | Vetters | F01D 25/005 |
| 2023/0184124 | A1 | 6/2023 | Stoyanov et al. | |
| 2023/0332506 | A1 | 10/2023 | Freeman et al. | |
| 2024/0003267 | A1 | 1/2024 | Cazin et al. | |

* cited by examiner

TURBINE SHROUD SYSTEM WITH CERAMIC MATRIX COMPOSITE SEGMENTS AND DUAL INTER-SEGMENT SEALS

FIELD OF THE DISCLOSURE

The present disclosure relates generally to turbine shroud assemblies, and more specifically to sealing of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and a fan, a propeller, or an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block hot gases from the gas path in the turbine from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a plurality of seals. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The first shroud wall may have a first radial outer surface and a first radial inner surface that defines the first portion of the gas path.

In some embodiments, the second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The second shroud wall may have a second radial outer surface and a second radial inner surface that defines the second portion of the gas path.

In some embodiments, the plurality of seals may extend circumferentially into the first shroud segment and the second shroud segment to block gases from escaping the gas path radially between the first shroud segment and the second shroud segment. The plurality of seals may include a first strip seal and a second strip seal. The first strip seal may extend axially along the first radial outer surface of the first shroud wall and the second radial outer surface of the second shroud wall to block the gases from passing radially between and beyond the first shroud wall and the second shroud wall. The second strip seal may extend circumferentially into the first shroud wall of the first blade track segment, the second shroud wall of the second blade track segment, the first carrier segment, and the second carrier segment.

In some embodiments, the second strip seal may include an axial segment and a forward radial segment. The axial segment may extend axially between a first end and a second end thereof opposite the first end and circumferentially into the first shroud wall and the second shroud wall. The forward radial segment may be coupled with the first end of the axial segment and may extend radially outward from the first end of the axial segment and circumferentially into each of the first carrier segment and the second carrier segment.

In some embodiments, the first strip seal and the second strip seal may cooperate to define a seal cavity radially therebetween. The first carrier segment may be formed to include a first air passage that opens into the seal cavity and directs air through the first carrier segment and into the seal cavity to urge the second strip seal radially inward into engagement with the first shroud wall and the second shroud wall. The first carrier segment and the second carrier segment may define a carrier plenum that extends circumferentially into the first carrier segment and the second carrier segment. The first shroud wall of the first blade track segment, the second shroud wall of the second blade track segment, and the first strip seal may cooperate to define an inner radial boundary of the carrier plenum. At least one of the first carrier segment and the second carrier segment may be formed to include a second air passage that directs the air into the carrier plenum to urge the first strip seal radially inward into engagement with the first shroud wall and the second shroud wall.

In some embodiments, the first carrier segment may include a first outer wall, a first flange that extends radially inward from the first outer wall, and a second flange axially spaced apart from the first flange and extending radially inward from the first outer wall. The first attachment feature of the first blade track segment may extend into the first carrier segment and may be located axially between the first flange and the second flange. The first air passage may be formed in the first flange.

In some embodiments, the first air passage may extend between an inlet and an outlet. The outlet may open circumferentially into the seal cavity from a circumferential face of the first carrier segment that faces toward the second carrier segment. The outlet may be located axially between the first strip seal and the second strip seal.

In some embodiments, the plurality of seals may include a third strip seal that extends circumferentially into the first carrier segment, the first shroud wall of the first blade track segment, the second carrier segment, and the second shroud wall of the second blade track segment. The third strip seal may extend radially outward from the second strip seal near an aft terminal end of the first strip seal to close an aft end of the seal cavity. The third strip seal and the second strip seal may be integrally formed as a single, one-piece component.

In some embodiments, the plurality of seals may include a fourth strip seal that extends circumferentially between the first carrier segment and the second carrier segment. The fourth strip seal may be located adjacent a forward terminal end of the first strip seal to close a forward end of the seal cavity. The first carrier segment may be formed to include a first air passage that opens into the seal cavity and directs air through the first carrier segment and into the seal cavity to urge the second strip seal radially inward into engagement with the first shroud wall and the second shroud wall. The first air passage may extend between an inlet and an outlet formed on a circumferential face of the first carrier segment that faces toward the second carrier segment. The outlet may be located radially inward of the fourth strip seal and axially between the second strip seal and the first strip seal.

In some embodiments, the second strip seal may include an axial segment that extends axially along the first radial outer surface of the first shroud wall and the second radial outer surface of the second shroud wall and a forward radial segment coupled with the axial segment and extending radially outward from the axial segment into the first carrier segment. The first carrier segment may be formed to include a first slot that extends radially outward from a radial inner surface of the first carrier segment to receive a radial outer end of the forward radial segment of the second strip seal therein. The first shroud wall of the first blade track segment may be formed to include a second slot that receives a radial inner end of the forward radial segment of the second strip seal therein. The first slot may have a first width and the second slot may have a second width that is less than the first width. The first slot may have a first width and the second slot may have a second width that is greater than the first width.

In some embodiments, the plurality of seals may include a third strip seal that extends circumferentially into the first carrier segment, the first shroud wall of the first blade track segment, the second carrier segment, and the second shroud wall of the second blade track segment. The third strip seal may extend radially outward from the second strip seal near an aft terminal end of the first strip seal. The first carrier segment may be formed to include a first slot that extends radially outward from a radial inner surface of the first carrier segment to receive a radial outer end of the third strip seal therein. The first shroud wall of the first blade track segment may be formed to include a second slot that receives a radial inner end of the third strip seal therein. The first slot may have a first width and the second slot may have a second width that is greater than the first width.

According to another aspect of the present disclosure, a method may comprise assembling a first shroud segment by coupling a first blade track segment with a first carrier segment to support the first blade track segment radially inward of the first carrier segment. The method may comprise assembling a second shroud segment by coupling a second blade track segment with a second carrier segment to support the second blade track segment radially inward of the second carrier segment. The method may comprise locating a first strip seal on a first radial outer surface of a first shroud wall of the first blade track segment and a second radial outer surface of a second shroud wall of the second blade track segment. The method may comprise locating an axial segment of a second strip seal in the first shroud wall of the first blade track segment and the second shroud wall of the second blade track segment to locate the axial segment of the second strip seal radially inward of the first strip seal.

In some embodiments, the method may comprise locating a forward radial segment of the second strip seal in the first shroud wall, the second shroud wall, the first carrier segment, and the second carrier segment. The method may comprise directing air through a first air passage formed in the first carrier segment and into a seal cavity formed between the first strip seal and the second strip seal.

In some embodiments, the method may comprise urging the second strip seal radially inward into engagement with the first shroud wall and the second shroud wall due to flow path gases located radially inward of the second strip seal having a second pressure that is less than a first pressure of the air in the seal cavity. The method may comprise urging the first strip seal radially inward against the first radial outer surface and the second radial outer surface due to plenum gases located radially outward of the first strip seal having a third pressure that is greater than the first pressure of the air in the seal cavity.

These and other features of the present disclosure will become more apparent from the following description of the illustrative embodiments.

DETAILED DESCRIPTION

Figure 1:
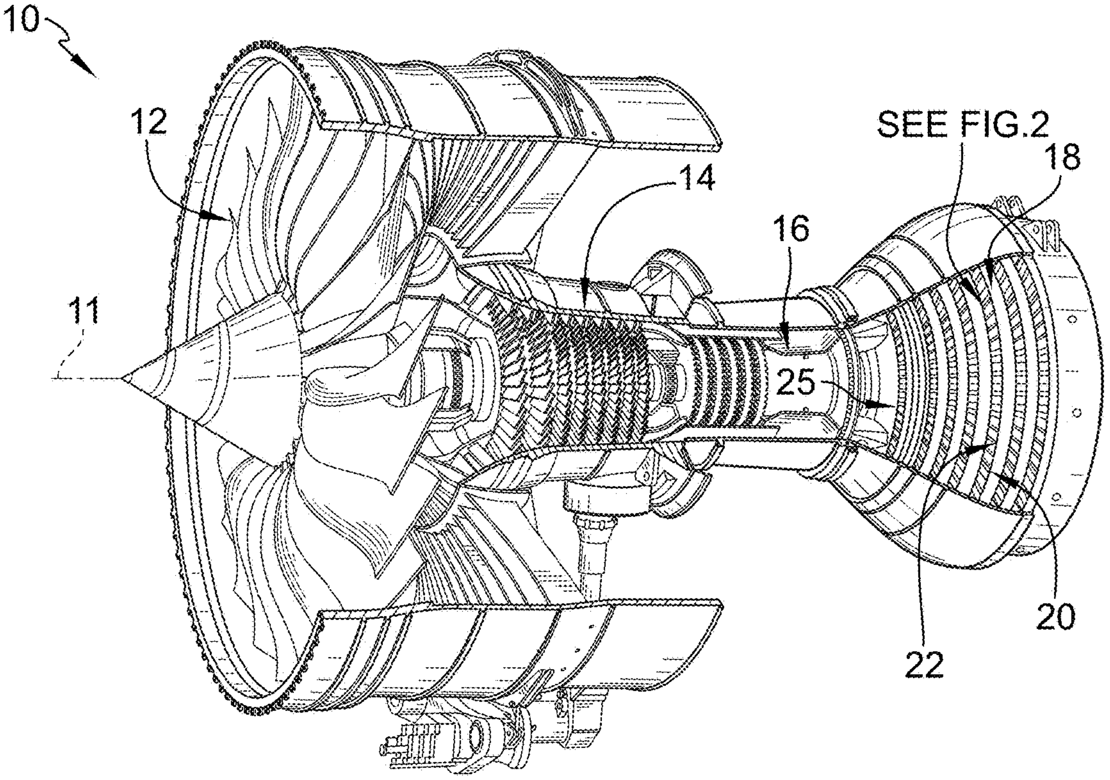
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
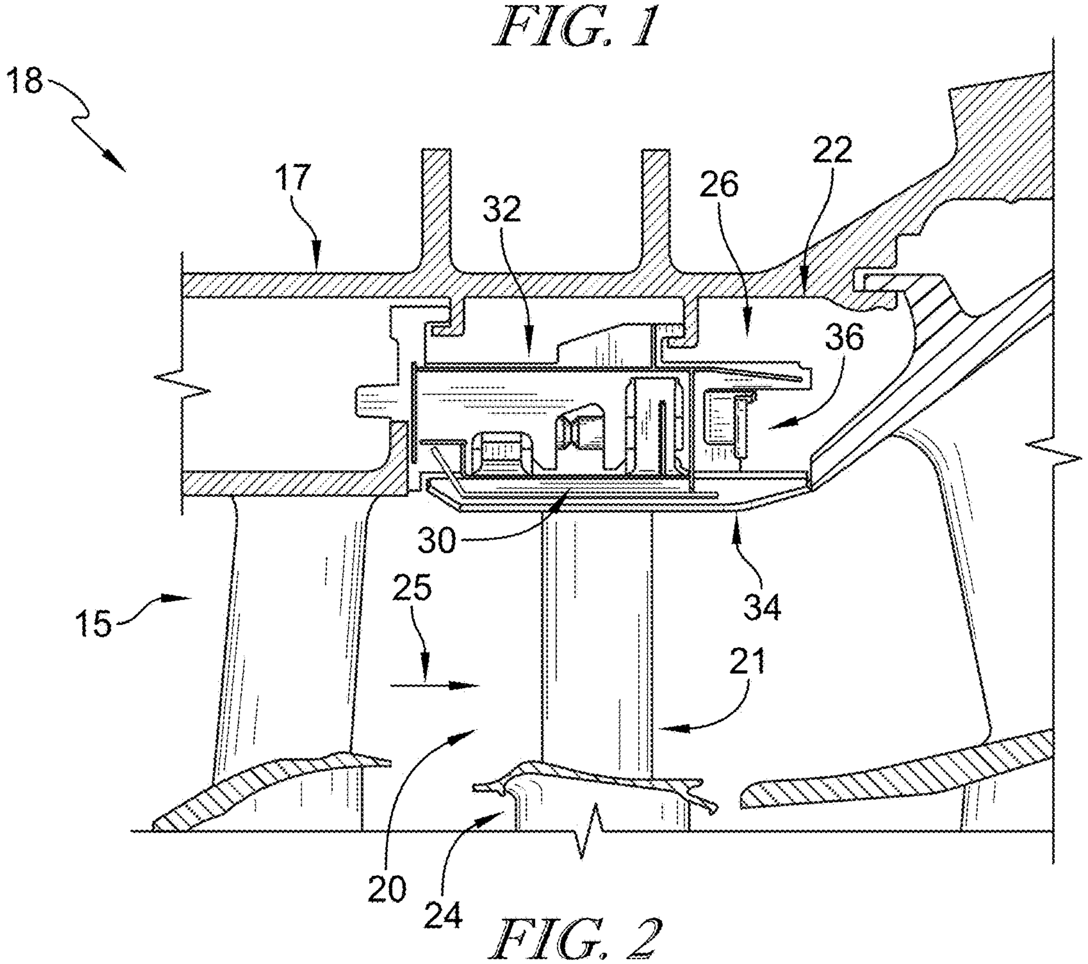
FIG. 2 is a cutaway perspective view of a portion of the turbine of FIG. 1 showing one of the turbine wheel assemblies and a shroud segment including a carrier segment coupled with a turbine case, a blade track segment that confronts the turbine wheel assembly and defines a portion of a gas path of the turbine, and a retainer that couples the blade track segment with the carrier segment, and further showing that a plurality of seals extend circumferentially into the shroud segment to block gases from passing between the shroud segment and a circumferentially adjacent shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 5:
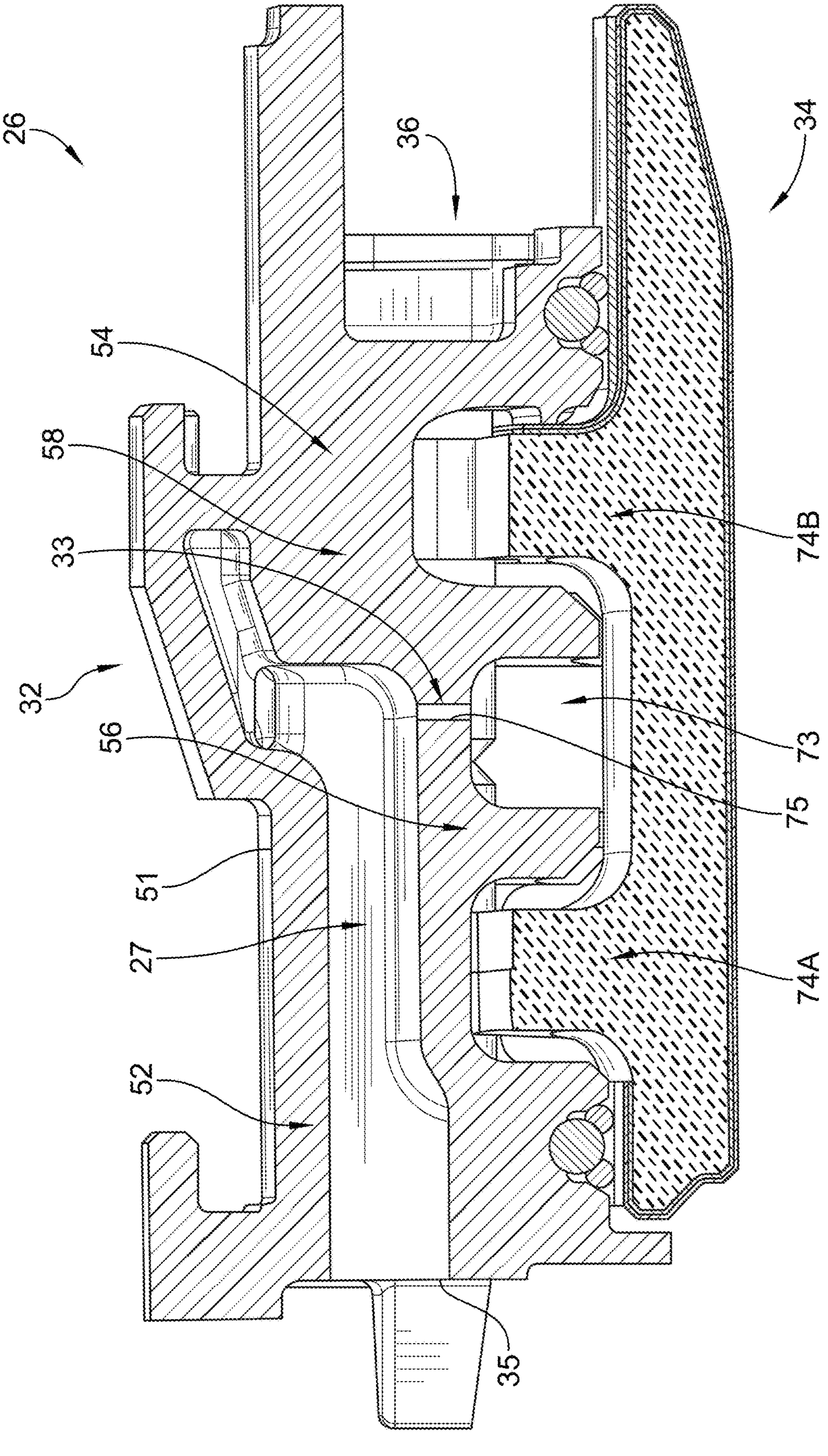
FIG. 5 is a cross-sectional view of the shroud segment of FIG. 3 showing that the carrier segment is formed to include an air passageway having a first air passage that opens into the seal cavity to direct air into the seal cavity and a second air passage that opens into a carrier plenum to direct air into the carrier plenum and to the first air passage.
Figure 6:
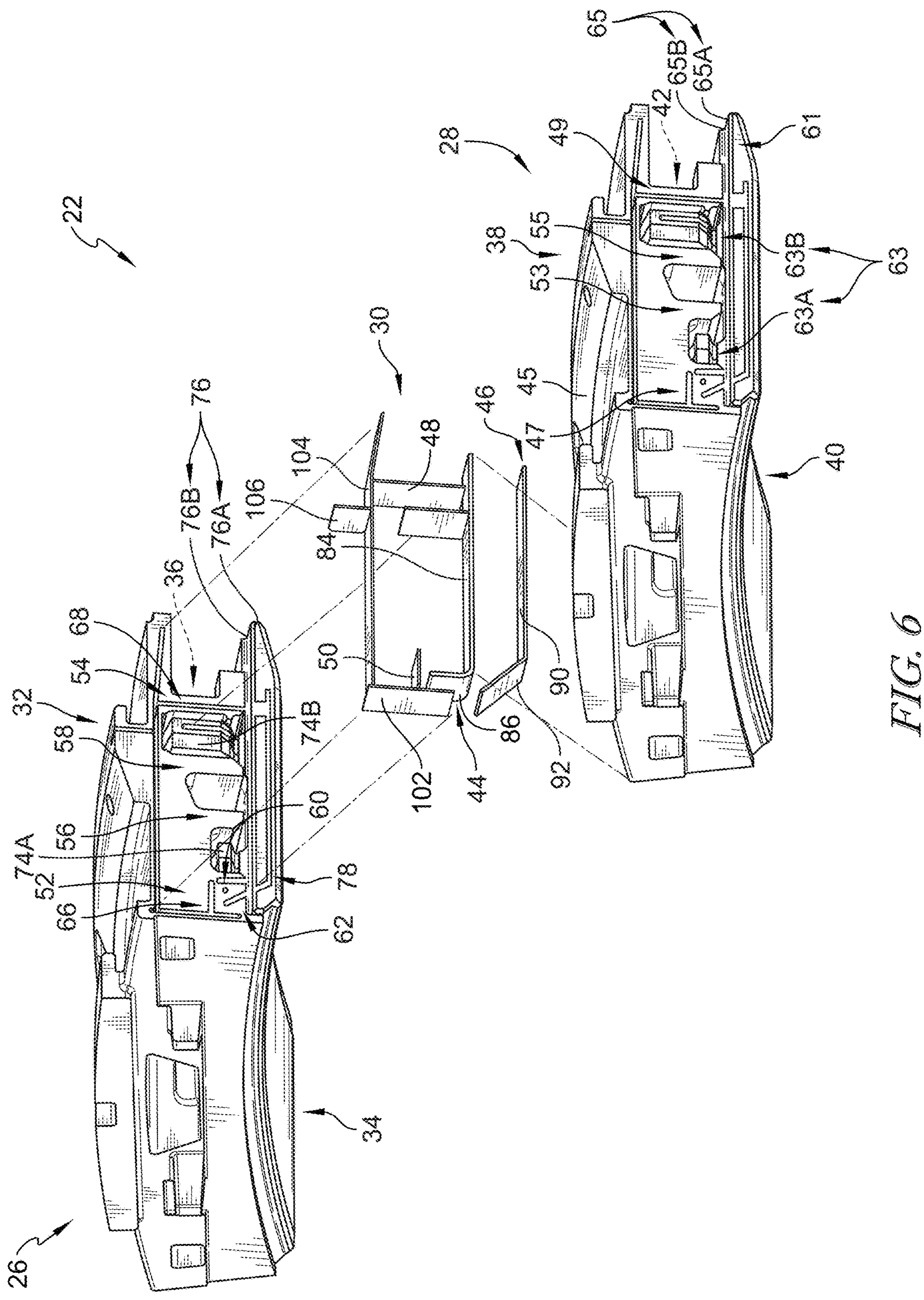
FIG. 6 is an exploded view of a first and a second shroud segment included in the gas turbine engine of FIG. 1, the second shroud segment including a carrier segment and a blade track segment supported by the carrier segment, and further suggesting that the plurality of seals extends circumferentially into the first shroud segment and the second shroud segment to block gases from escaping the gas path radially between the first shroud segment and the second shroud segment.

The turbine shroud assembly 22 includes a plurality of shroud segments and pluralities of seals between adjacent shroud segments as suggested in FIGS. 2 and 6. Of the plurality of shroud segments, a first shroud segment 26 and a second shroud segment 28 are discussed in detail below. Likewise, a plurality of seals 30 included in the pluralities of seals used in the turbine shroud assembly 22 is shown in FIGS. 2-7. The first shroud segment 26, the second shroud segment 28, and the plurality of seals 30 are representative of other adjacent shroud segments and pluralities of seals included in the turbine shroud assembly 22.

Figure 3:
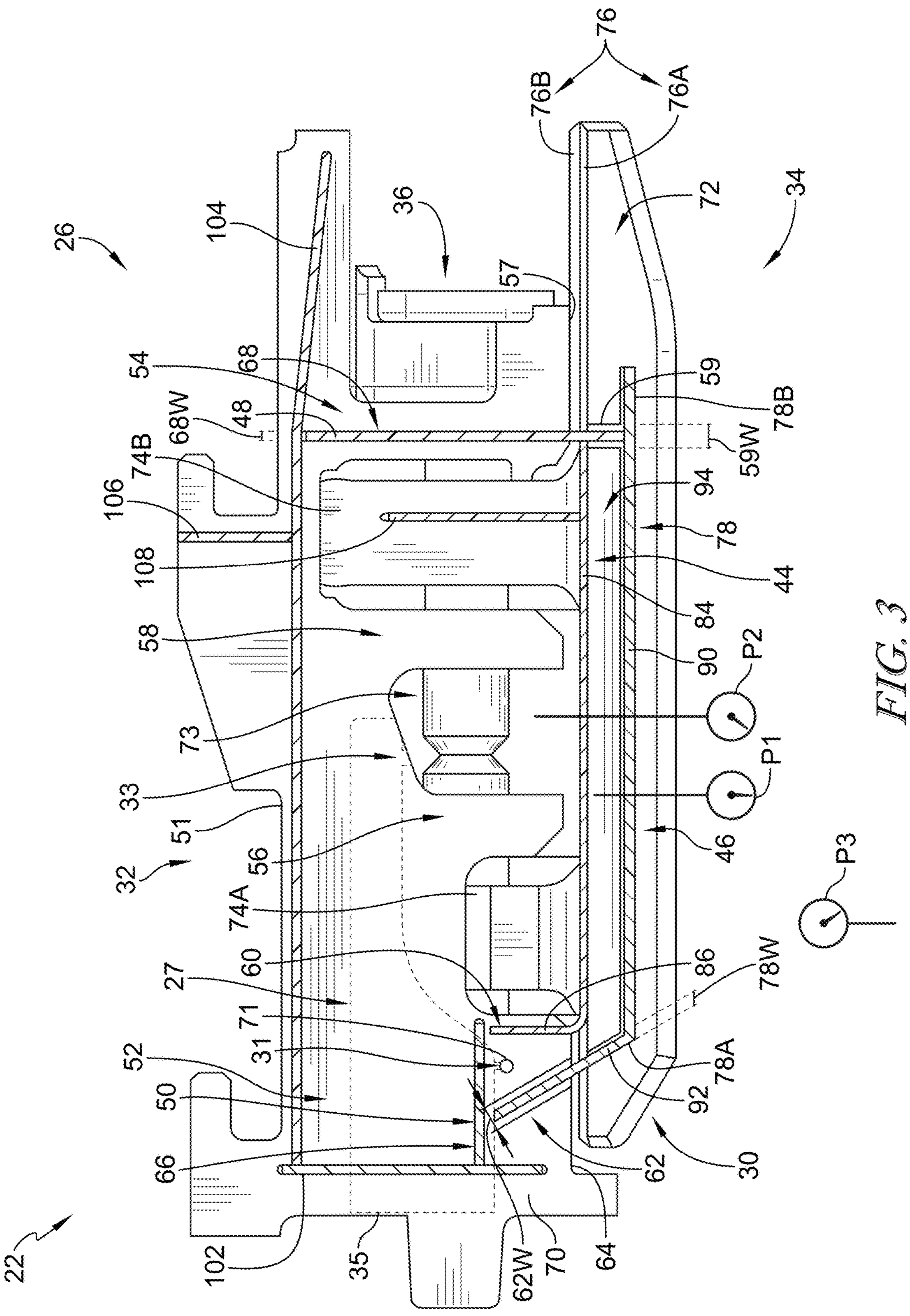
FIG. 3 is a cross-sectional view of the turbine shroud assembly through the plurality of seals of FIG. 2 showing that the blade track segment includes a shroud wall that is formed to include a recess that extends circumferentially into the shroud wall, and a first strip seal extends axially along a radial outer surface of the shroud wall, a second strip seal extends circumferentially into the recess, a third strip seal extends radially outward from the second strip seal near an aft terminal end of the first strip seal and into the carrier segment, and a fourth strip seal extends into the carrier segment adjacent a forward terminal end of the first strip seal such that the first, second, third, and fourth strip seals cooperate to form a seal cavity that provides a pressurized space between the first strip seal and the second strip seal.

The plurality of seals 30 in the illustrative embodiment includes a first strip seal 44, a second strip seal 46, a third strip seal 48, and a fourth strip seal 50, among other seals, as shown in FIG. 3. The first strip seal 44 blocks gases from the gas path 25 from passing radially between the first shroud segment 26 and the second shroud segment 28. The second strip seal 46 reduces a pressure load applied to the first strip seal 44 from the gases in the gas path 25. The second strip seal 46 also provides a heat shield for the first strip seal 44 to protect the first strip seal 44 from heat of the gases in the gas path 25. A seal cavity 94 is formed between the first strip seal 44 and the second strip seal 46. The third strip seal 48 closes an aft end of the seal cavity 94, and the fourth strip seal 50 closes a forward end of the seal cavity 94. In some embodiments, the plurality of seals 30 includes strip seals 102, 104, 106, 108 as shown in FIGS. 3 and 6. In other embodiments, one or more of the strip seals 102, 104, 106, 108 may be included or omitted from the plurality of seals 30. In the illustrative embodiment, additional seals are included and used to block gases and, in other embodiments, the additional seals may be included or omitted.

Figure 7:
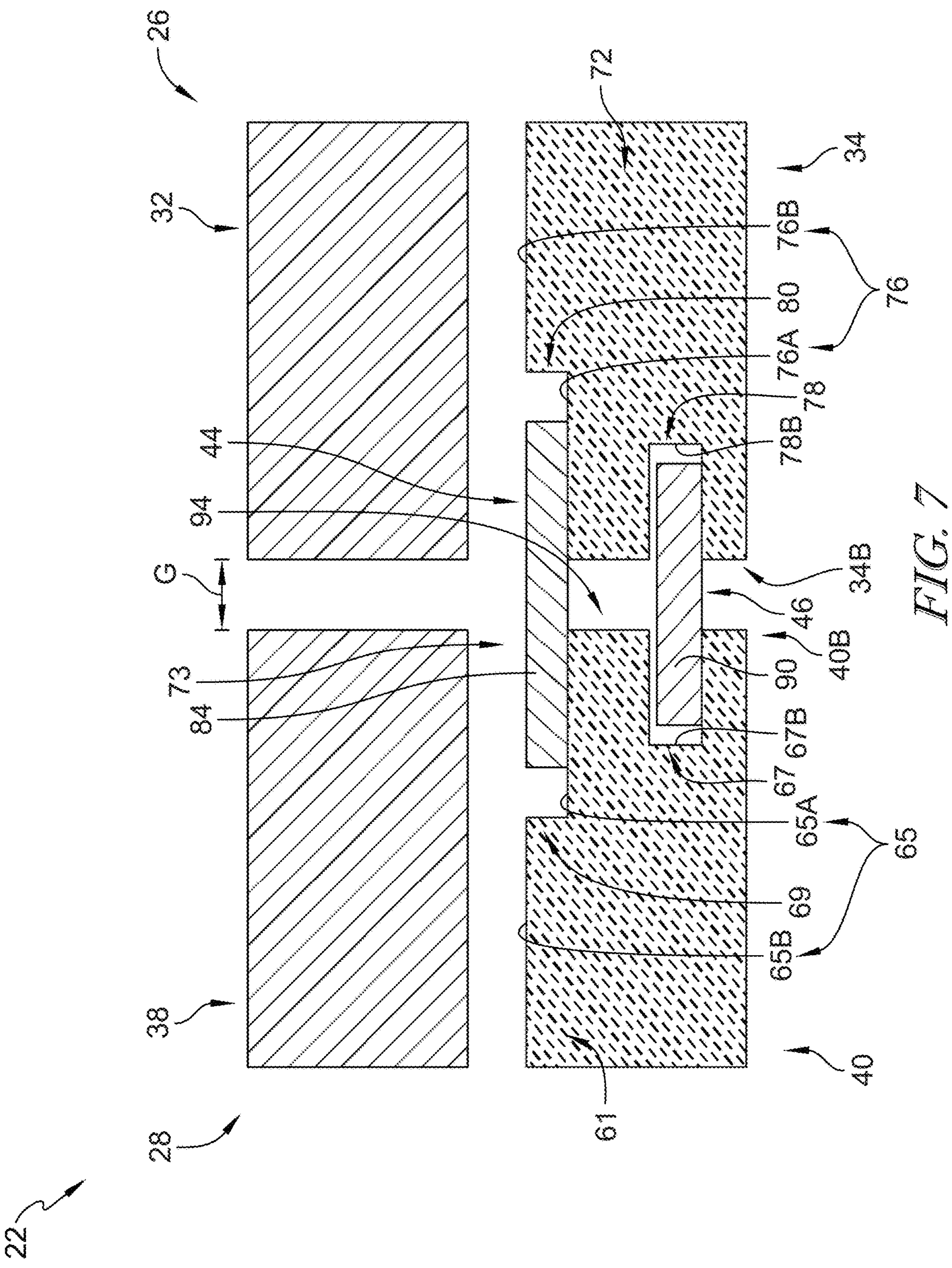
FIG. 7 is a cross-sectional diagrammatic view through the first and second shroud segments as assembled in the turbine shroud assembly of FIG. 1 showing that the first shroud segment and the second shroud segment are assembled adjacent one another with a gap (G) and the first strip seal and the second strip seal each extend circumferentially (left and right as depicted) between the first shroud segment and the second shroud segment to block gases from flowing through the gap, and further suggesting that the first and second seals are pressurized into radial inward engagement with the first and second shroud segments.

The second shroud segment 28 is arranged circumferentially adjacent the first shroud segment 26 about the central axis 11. A circumferential gap G is formed between the first shroud segment 26 and the second shroud segment 28 as shown in FIG. 7. Though the turbine shroud assembly 22 is shown and described as having two shroud segments 26, 28 and a plurality of seals 30, the turbine shroud assembly 22 includes additional shroud segments and additional seals so that the turbine shroud assembly 22 extends entirely circumferentially about the central axis 11 as suggested in FIG. 1.

Figure 4:
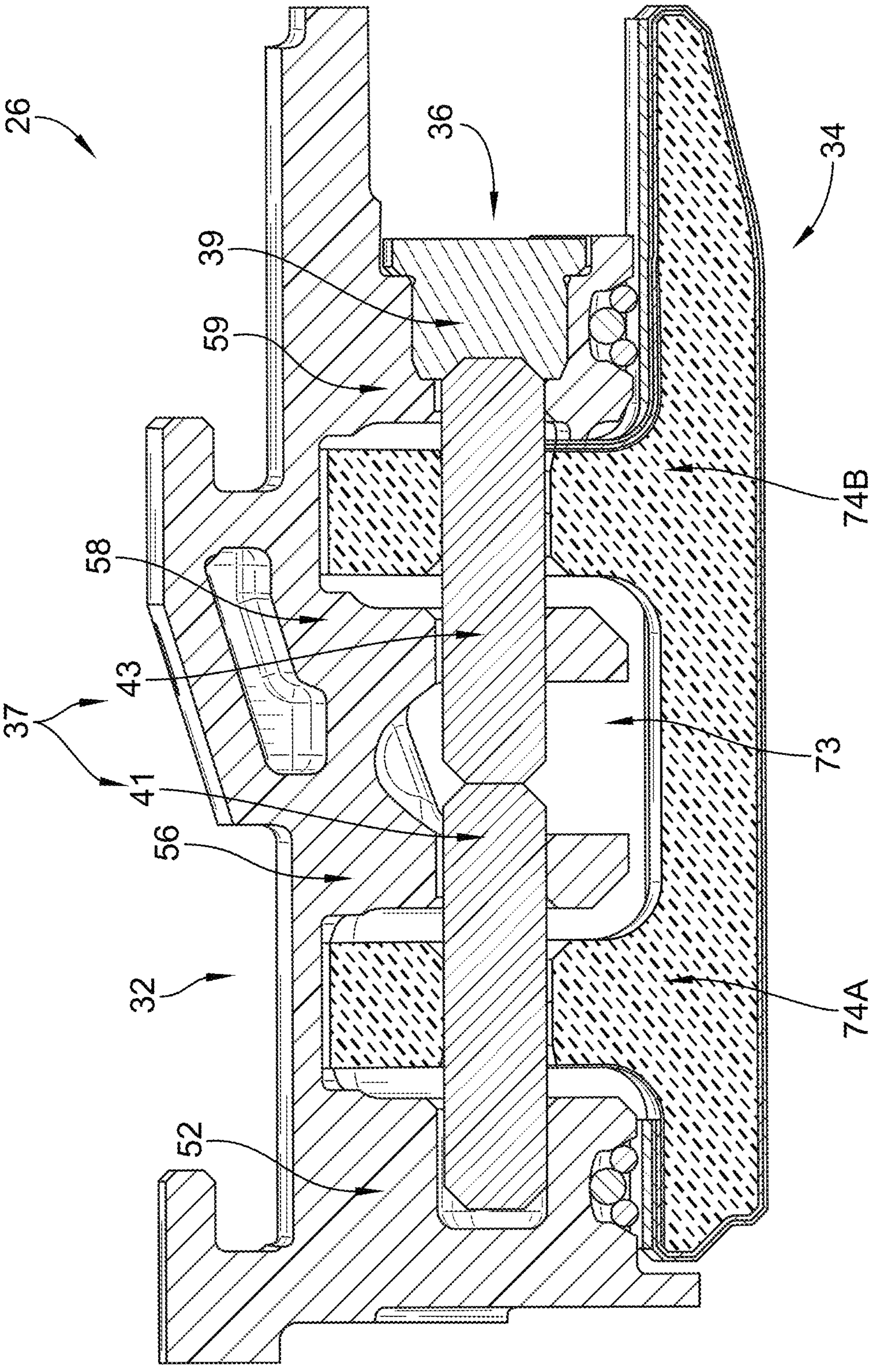
FIG. 4 is a cross-sectional view of the shroud segment of FIG. 3 showing one of the two retainers of the shroud segment includes a forward pin and an aft pin that extend through the blade track segment and through the carrier segment to couple the blade track segment to the carrier segment.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a first portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 6. The second carrier segment 38 is arranged circumferentially at least partway around the central axis 11 and is coupled with the outer case 17 with hook features in the illustrative embodiment. The second blade track segment 40 is supported by the second carrier segment 38 to define a second portion of the gas path 25. The second retainer 42 extends axially through the second carrier segment 38 and the second blade track segment 40 to couple the second carrier segment 38 and the second blade track segment 40 together.

The plurality of seals 30 extends circumferentially into the first shroud segment 26 and the second shroud segment 28 as shown in FIG. 7 and as suggested in FIG. 6. The plurality of seals 30, along with the other strip seals 102, 104, 106, 108, blocks gases in the gas path 25 from escaping the gas path 25 radially outward and circumferentially between the first shroud segment 26 and the second shroud segment 28 through the circumferential gap G.

Degradation and fluttering of strip seals may be a concern in turbine shroud assemblies. To minimize degradation of the first strip seal 44, the second strip seal 46 is located radially inward of the first strip seal 44 to protect the first strip seal 44 from heat of the gases in the gas path 25. Further, to minimize fluttering, and thus, reduce the possibility of failure of the first strip seal 44, the second strip seal 46 reduces a pressure load applied to the first strip seal 44 of the present disclosure from the gases in the gas path 25 so that the first strip seal 44 is urged radially inwardly against the blade track segments 34, 40 and any flutter or vibration is dampened. In the illustrative embodiments, the first strip seal 44 is configured to withstand the pressure and heat of the gases in the gas path 25 if the second strip seal 46 were to fail. As a result, the first strip seal 44 and the second strip seal 46 provide redundant and backup sealing.

Turning back to the first shroud segment 26, the first carrier segment 32 of the first shroud segment 26 includes a first outer wall 51, a first flange 52, and a second flange 54 as shown in FIG. 3. The first flange 52 extends radially inward from the first outer wall 51. The second flange 54 is axially spaced apart from the first flange 52 and extends radially inward from the first outer wall 51.

The first flange 52 is formed to include a first slot 60 and a second slot 62 as shown in FIG. 3. The first slot 60 extends circumferentially into the first flange 52 and is shaped to receive a portion of the first strip seal 44 therein. Illustratively, the first slot 60 extends straight radially outward into the first flange 52 from a radial inner surface 64 of the first flange 52. The second slot 62 extends circumferentially into the first flange 52 and is located axially forward of the first slot 60. Illustratively, the second slot 62 extends radially outward and axially forward from the radial inner surface 64 of the first flange 52 and is shaped to receive a portion of the second strip seal 46 therein. The second slot 62 has a first width 62W as shown in FIG. 3.

The first flange 52 is further formed to include a third slot 66 that extends circumferentially into the first flange 52 from a circumferential face 70 of the first flange 52 that faces toward the second carrier segment 38. The third slot 66 is shaped to receive a portion of the fourth strip seal 50 therein. Illustratively, the third slot 66 is horizontal and located radially outward of the first slot 60 and the second slot 62. The second flange 54 is formed to include a fourth slot 68 that extends circumferentially into the second flange 54 and is shaped to receive a portion of the third strip seal 48 therein. Illustratively, the fourth slot 68 extends straight radially outward into the second flange 54 from a radial inner surface 57 of the second flange 54. The fourth slot 68 has a second width 68W.

The first carrier segment 32 further includes a third flange 56 and a fourth flange 58 as shown in FIG. 3. Each of the third flange 56 and the fourth flange 58 extends radially inward from the first outer wall 51. The third flange 56 is located axially between the first flange 52 and the fourth flange 58. The fourth flange 58 is located axially between the third flange 56 and the second flange 54. Each of the flanges 52, 54, 56, 58 of the first carrier segment 32 is formed to include a hole that receives the first retainer 36 therein as shown in FIGS. 3 and 4. Illustratively, the first carrier segment 32 is made of metallic materials.

The first carrier segment 32 is formed to include an air passageway 27 as shown in FIG. 3. The air passageway 27 directs air through the first carrier segment 32 from, for example, the compressor 14. The air passageway 27 includes a first air passage 31 and a second air passage 33 as shown in FIGS. 3 and 5. The first air passage 31 opens into the seal cavity 94. The first air passage 31 extends through the first flange 52 of the first carrier segment to the circumferential face 70 thereof between an inlet 35 and an outlet 71. The outlet 71 is formed on the circumferential face 70 of the first flange 52 and directs air circumferentially toward the second carrier segment 38. The air is further directed radially inward and axially aft by the plurality of seals 30. In some embodiments, the first flange 52 includes a recessed portion that is recessed relative to the circumferential face 70. The outlet 71 is located on the recessed portion, and the recessed portion aids in directing the air radially inwardly from the outlet 71 into the seal cavity 94.

The second air passage 33 opens into a carrier plenum 73 as shown in FIG. 5. The first carrier segment 32 and the second carrier segment 38 define the carrier plenum 73 that extends circumferentially into the first carrier segment 32 and the second carrier segment 38. The first blade track segment 34, the second blade track segment 40, and the first strip seal 44 cooperate to define an inner radial boundary of the carrier plenum 73. The second air passage 33 extends between the inlet 35 and an outlet 75 formed on a radial inner surface of the first carrier segment 32 between the third flange 56 and the fourth flange 58.

The first blade track segment 34 includes a first shroud wall 72 and a first attachment feature 74 that extends radially outward from the first shroud wall 72 as shown in FIGS. 3 and 4. The first shroud wall 72 extends circumferentially partway around the central axis 11. The first shroud wall 72 has a first radial outer surface 76 that faces toward the first carrier segment 32 and a first radial inner surface opposite the first radial outer surface 76 that faces toward the gas path 25. Illustratively, the first attachment feature 74 includes a first attachment flange 74A and a second attachment flange 74B axially aft of the first attachment flange 74A. Each of the attachment flanges 74A, 74B is formed to include a hole that receives the first retainer 36 therein. The first attachment flange 74A is located axially between the first flange 52 and the third flange 56 as shown in FIG. 3. The second attachment flange 74B is located axially between the fourth flange 58 and the second flange 54. Illustratively, the first blade track segment 34 is made of ceramic matrix composite materials.

The first radial outer surface 76 of the first shroud wall 72 includes a first portion 76A and a second portion 76B as shown in FIGS. 6 and 7. The second portion 76B is spaced radially outward from the first portion 76A. The first portion 76A defines a circumferential end 34B of the first shroud wall 72 that confronts the second blade track segment 40 as shown in FIG. 7. The second portion 76B extends circumferentially away from the first portion 76A. The circumferential end 34B is formed with a first pocket 80 that defines the first portion 76A of the first radial outer surface 76. The first shroud wall 72 slopes radially inwardly at the circumferential end 34B to define the first portion 76A of the first radial outer surface 76. The first and second portions 76A, 76B of the first radial outer surface 76 are exposed to air located in the carrier plenum 73. The first strip seal 44 of the plurality of seals 30 is located on the first portion 76A of the first radial outer surface 76 as shown in FIG. 7.

The circumferential end 34B of the first shroud wall 72 is formed to include a first recess 78 extending circumferentially into the first shroud wall 72 to receive the second strip seal 46 therein as shown in FIGS. 3 and 7. The first recess 78 of the first shroud wall 72 includes a radially-extending portion 78A that extends radially inward and axially aft from the first portion 76A of the first radial outer surface 76 and an axially-extending portion 78B that extends axially aft from the radially-extending portion 78A. The radially-extending portion 78A has a third width 78W. In some embodiments, as shown in FIG. 3, the third width 78W is less than the first width 62W of the second slot 62. The axially-extending portion 78B of the first recess 78 is radially spaced apart from the first portion 76A of the first radial outer surface 76 of the first shroud wall 72. The first shroud wall 72 is formed to include a first groove 59 as shown in FIG. 3. The first groove 59 extends straight radially outward from the axially-extending portion 78B of the first recess 78 to the first portion 76A of the first radial outer surface 76. The first groove 59 has a fourth width 59W. In some embodiments, the fourth width 59W is greater than the second width 68W of the fourth slot 68, as shown in FIG. 3.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37. In the illustrative embodiment, the mount pin 37 includes a forward pin 41 and an aft pin 43 as shown in FIG. 4. The forward pin 41 and the aft pin 43 of the mount pin 37 are circumferentially aligned with one another. In this embodiment, the forward pin 41 is separate from the aft pin 43 so as to allow for independent loading during use in the gas turbine engine 10. In some embodiments, the mount pin 37 is formed as a single pin. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 45, a fifth flange 47, and a sixth flange 49 as shown in FIG. 6. The fifth flange 47 extends radially inward from the second outer wall 45. The sixth flange 49 is axially spaced apart from the fifth flange 47 and extends radially inward from the second outer wall 45. The fifth flange 47 is formed to include a first slot and a second slot similar to the first slot 60 and the second slot 62 of the first carrier segment 32. The first slot extends circumferentially into the fifth flange 47 and is shaped to receive a portion of the first strip seal 44 therein. The second slot extends circumferentially into the fifth flange 47 and is located axially forward of the first slot. Illustratively, the second slot is shaped to receive a portion of the second strip seal 46 therein. The fifth flange 47 is further formed to include a third slot (similar to the third slot 66) that extends circumferentially into the fifth flange 47 from a circumferential face of the fifth flange 47 that faces toward the first carrier segment 32. The third slot is shaped to receive a portion of the fourth strip seal 50 therein. The sixth flange 49 is formed to include a fourth slot (similar to the fourth slot 68) that extends circumferentially into the sixth flange 49 and is shaped to receive a portion of the third strip seal 48 therein. The first slot, the second slot, the third slot, and the fourth slot are aligned with the first slot 60, the second slot 62, the third slot 66, and the fourth slot 68, respectively, of the first carrier segment 32 while the first shroud segment 26 and the second shroud segment 28 are assembled adjacent one another.

The second carrier segment 38 further includes a seventh flange 53 and an eighth flange 55 as shown in FIG. 6. Each of the seventh flange 53 and the eighth flange 55 extend radially inward from the second outer wall 45. The seventh flange 53 is located axially between the fifth flange 47 and the eighth flange 55. The eighth flange 55 is located axially between the seventh flange 53 and the sixth flange 49. The seventh and eighth flanges 53, 55 may be inner flanges or clevises that are both located axially inward of the fifth flange 47 and the sixth flange 49. Each of the flanges 47, 49, 53, 55 of the second carrier segment 38 is formed to include a hole that receives the second retainer 42 therein.

In some embodiments, the second carrier segment 38 is formed to include an air passageway identical to the air passageway 27 of the first carrier segment 32. In such an embodiment, a first air passage opens into the seal cavity 94 from a circumferential face of the fifth flange 47 and a second air passage opens into the carrier plenum 73. In some embodiments, the first air passage of the second carrier segment 38 is omitted such that the second carrier segment 38 only includes the second air passage that opens into the carrier plenum 73. In some embodiments, the air passageway is omitted from the second carrier segment 38 such that the seal cavity 94 and the carrier plenum 73 are only fed from the air passageway 27 of the first carrier segment 32.

The second blade track segment 40 includes a second shroud wall 61 and a second attachment feature 63 that extends radially outward from the second shroud wall 61 as shown in FIG. 6. The second shroud wall 61 has a second radial outer surface 65 that faces toward the second carrier segment 38 and a second radial inner surface opposite the second radial outer surface 65 that faces toward the gas path 25. The second shroud wall 61 extends circumferentially partway around the central axis 11. Illustratively, the second attachment feature 63 includes a third attachment flange 63A and a fourth attachment flange 63B axially aft of the third attachment flange 63A. Each of the attachment flanges 63A, 63B is formed to include a hole that receives the second retainer 42 therein. The third attachment flange 63A is located axially between the fifth flange 47 and the seventh flange 53. The fourth attachment flange 63B is located axially between the eighth flange 55 and the sixth flange 49. Illustratively, the second blade track segment 40 is made of ceramic matrix composite materials.

The second radial outer surface 65 of the second shroud wall 61 includes a first portion 65A and a second portion 65B as shown in FIGS. 6 and 7. The second portion 65B is spaced radially outward from the first portion 65A. The first portion 65A defines a circumferential end 40B of the second shroud wall 61 that confronts the first blade track segment 34 as shown in FIG. 7. The second portion 65B extends circumferentially away from the first portion 65A. The circumferential end 40B is formed with a second pocket 69 that defines the first portion 65A of the second radial outer surface 65 as shown in FIGS. 6 and 7. The second shroud wall 61 slopes radially inwardly at the circumferential end 40B to define the first portion 65A of the second radial outer surface 65. The first and second portions 65A, 65B of the second radial outer surface 65 are exposed to air in the carrier plenum 73. The first strip seal 44 of the plurality of seals 30 is located on the first portion 65A of the second radial outer surface 65 as shown in FIG. 7.

The circumferential end 40B is formed to include a second recess 67 extending circumferentially into the second shroud wall 61 to receive the second strip seal 46 therein as shown in FIG. 7. The second recess 67 of the second shroud wall 61 includes a radially-extending portion that extends radially inward and axially aft from the first portion 65A of the second radial outer surface 65 and an axially-extending portion 67B that extends axially aft from the radially-extending portion. The axially-extending portion 67B is radially spaced apart from the first portion 65A of the second radial outer surface 65 of the second shroud wall 61. The second shroud wall 61 is formed to include a second groove similar to the first groove 59 that extends radially outward from the axially-extending portion 67B of the second recess 67 to the first portion 65A of the second radial outer surface 65. The second retainer 42 is the same as the first retainer 36 such that description of the first retainer 36 also applies to the second retainer 42.

The plurality of seals 30 includes the first strip seal 44, the second strip seal 46, the third strip seal 48, and the fourth strip seal 50 shown in FIG. 3. The first strip seal 44 extends between the first blade track segment 34 and the second blade track segment 40 to block the gases from passing radially between and beyond the first shroud wall 72 and the second shroud wall 61 as shown in FIG. 7. The second strip seal 46 is located radially inward of the first strip seal 44 and extends into the first blade track segment 34, the second blade track segment 40, the first carrier segment 32, and the second carrier segment 38. The third strip seal 48 is located radially outward of the second strip seal 46 and extends from the first blade track segment 34 and the second blade track segment 40 and into the first carrier segment 32 and the second carrier segment 38. The fourth strip seal 50 extends into and between the first carrier segment 32 and the second carrier segment 38.

The first strip seal 44 includes a body segment 84 and a forward segment 86 as shown in FIGS. 3 and 6. The body segment 84 extends axially along the first portion 76A of the first radial outer surface 76 of the first shroud wall 72 and the first portion 65A of the second radial outer surface 65 of the second shroud wall 61 between a first end and a second end thereof opposite the first end. The forward segment 86 is coupled to the first end of the body segment 84 and extends radially outward from the first end of the body segment 84 into the first slot 60 formed in the first flange 52 of the first carrier segment 32 and the first slot formed in the fifth flange 47 of the second carrier segment 38. The forward segment 86 extending into the slots 60 retains the first strip seal 44 axially relative to the first shroud segment 26 so that the first strip seal 44 does not move fore and aft. A radial inner surface of the body segment 84 directly contacts the first portions 76A, 65A of the shroud walls 72, 61 as shown in FIG. 7. A radial outer surface of the body segment 84 is exposed to air in the carrier plenum 73.

The first pocket 80 of the first blade track segment 34 and the second pocket 69 of the second blade track segment 40 retain the body segment 84 of the first strip seal 44 circumferentially between the first blade track segment 34 and the second blade track segment 40 as suggested in FIG. 7. The body segment 84 may move circumferentially a marginal amount, however, the pockets 80, 69 block the body segment 84 from moving such that the circumferential gap G is no longer blocked.

The second strip seal 46 is located radially inward of the first strip seal 44 as shown in FIG. 3. The second strip seal 46 extends circumferentially into the first recess 78 of the first blade track segment 34 and the second recess 67 of the second blade track segment 40 to block the circumferential gap G. The second strip seal 46 includes an axial segment 90 and a forward radial segment 92 as shown in FIG. 3. The axial segment 90 extends axially between a first end and a second end thereof opposite the first end. The forward radial segment 92 is coupled with the first end of the axial segment 90 to extend axially forward and radially outward from the first end of the axial segment 90 into the first carrier segment 32. The second end of the axial segment 90 terminates in an axial direction.

The axial segment 90 of the second strip seal 46 is located in the axially-extending portions 78B, 67B of the recesses 78, 67 as shown in FIGS. 3 and 7. The forward radial segment 92 is located in the radially-extending portions 78A of the recesses 78, 67 as shown in FIG. 3. The forward radial segment 92 extends from the radially-extending portions 78A of the recesses 78, 67 into the second slots 62 formed in the first flange 52 and the fifth flange 47 of the carrier segments 32, 38. Because the first width 62W of the second slot 62 is greater than the third width 78W of the radially-extending portion 78A of the first recess 78, the second strip seal 46 does not bind in the first carrier segment 32 or impart stress to the first carrier segment 32.

The third strip seal 48 extends circumferentially into the fourth slot 68 of the first carrier segment 32, the first groove 59 of the first shroud wall 72 of the first blade track segment 34, the fourth slot of the second carrier segment 38, and the second groove of the second shroud wall 61 of the second blade track segment 40 as shown in FIG. 3. Illustratively, the third strip seal 48 extends radially outward from the second strip seal 46 such that a radial inner end of the third strip seal 48 abuts the axial segment 90 of the second strip seal 46. The third strip seal 48 is located axially aft of the first strip seal 44 such that the third strip seal 48 abuts the second end of the body segment 84 of the first strip seal 44. The third strip seal 48 extends from the first groove 59 into the fourth slot 68, and because the second width 68W of the fourth slot 68 is less than the fourth width 59W of the first groove 59, the third strip seal 48 does not bind in the first blade track segment 34 or impart stress to the first blade track segment 34. Illustratively, the third strip seal 48 extends straight radially outward from the axial segment 90 of the second strip seal 46.

The fourth strip seal 50 extends circumferentially between the third slot 66 of the first carrier segment 32 and the third slot of the second carrier segment 38 as shown in FIG. 3. Illustratively, the fourth strip seal 50 extends straight axially aft from the strip seal 102. The fourth strip seal 50 is located radially outward of the forward radial segment 92 of the second strip seal 46 and the forward segment 86 of the first strip seal 44. The fourth strip seal 50 is located adjacent a radially outermost end of the first strip seal 44 and a radially outermost end of the second strip seal 46. The outlet 71 of the first air passage 31 is located radially inward of the fourth strip seal 50 and axially between the forward radial segment 92 of the second strip seal 46 and the forward segment 86 of the first strip seal 44.

The first strip seal 44 and the second strip seal 46 cooperate to define the seal cavity 94 radially therebetween as shown in FIG. 3. The third strip seal 48 closes an aft end of the seal cavity 94, and the fourth strip seal 50 closes a forward end of the seal cavity 94. Air is directed through the first air passage 31 and into the seal cavity 94. The forward radial segment 92 and the forward segment 86 direct the air radially inward from the outlet 71, and the body segment 84 and the axial segment 90 direct the air axially aft through the seal cavity 94. The air that is directed into the seal cavity 94 has a first pressure P1. The air in the carrier plenum 73 has a second pressure P2 that is greater than the first pressure P1. As shown in FIG. 3, the gases in the gas path 25 have a third pressure P3 near an axial forward end of the first blade track segment 34. The third pressure P3 is less than the first pressure P1 and the second pressure P2. The gases in the gas path 25 near an axial aft end of the first blade track segment 34 have a pressure that is less than the third pressure P3 caused by work being extracted from the gases by the blades 21.

Due to the pressure differential between the first pressure P1 and the second pressure P2, the first strip seal 44 is urged radially inward against the first portion 76A of the first radial outer surface 76 and the first portion 65A of the second radial outer surface 65 as shown in FIGS. 3 and 7. The first pressure P1 of the air in the seal cavity 94 being greater than the third pressure P3 of the gases in the gas path 25 force the second strip seal 46 radially inwardly within the recesses 78, 67 such that the axial segment 90 of the second strip seal 46 engages radial inner surfaces of the recesses 78, 67 as shown in FIGS. 3 and 7. Thus, each of the first strip seal 44 and the second strip seal 46 are pressure activated.

Because the axial segment 90 of the second strip seal 46 is urged radially inwardly within the recesses 78, 67, a small portion of a radial inner surface of the second strip seal 46 is exposed to the gases in the gas path 25, and thus, to the heat of the gases in the gas path 25. An entirety of a radial outer surface of the axial segment 90 of the second strip seal 46 is exposed to the air in the seal cavity 94 as shown in FIG. 7. The air in the seal cavity 94 cools the second strip seal 46. The air in the seal cavity 94 may leak out of the seal cavity 94 to the gas path 25 aft of the blades 21.

In some embodiments, the turbine shroud assembly 22 further includes strip seals 102, 104, 106, 108 as shown in FIGS. 3 and 6. Each of the strip seals 102, 104, 106 extends into the first carrier segment 32 and the second carrier segment 38. The strip seal 108 extends into each of the second attachment flange 74B of the first blade track segment 34 and the fourth attachment flange 63B of the second blade track segment 40. The first carrier segment 32 and the second carrier segment 38 are each formed to include grooves sized to receive the strip seals 102, 104, 106 therein as shown in FIGS. 3 and 6. The second attachment flange 74B of the first blade track segment 34 and the fourth attachment flange 63B of the second blade track segment 40 are each formed to include a groove sized to receive the strip seal 108 therein. The strip seals 102, 104, 106, 108 provide additional sealing between the first shroud segment 26 and the second shroud segment 28. In some embodiments, the strip seal 104 includes a straight portion and an angled portion aft of the straight portion that is angled radially inwardly.

Figure 8:
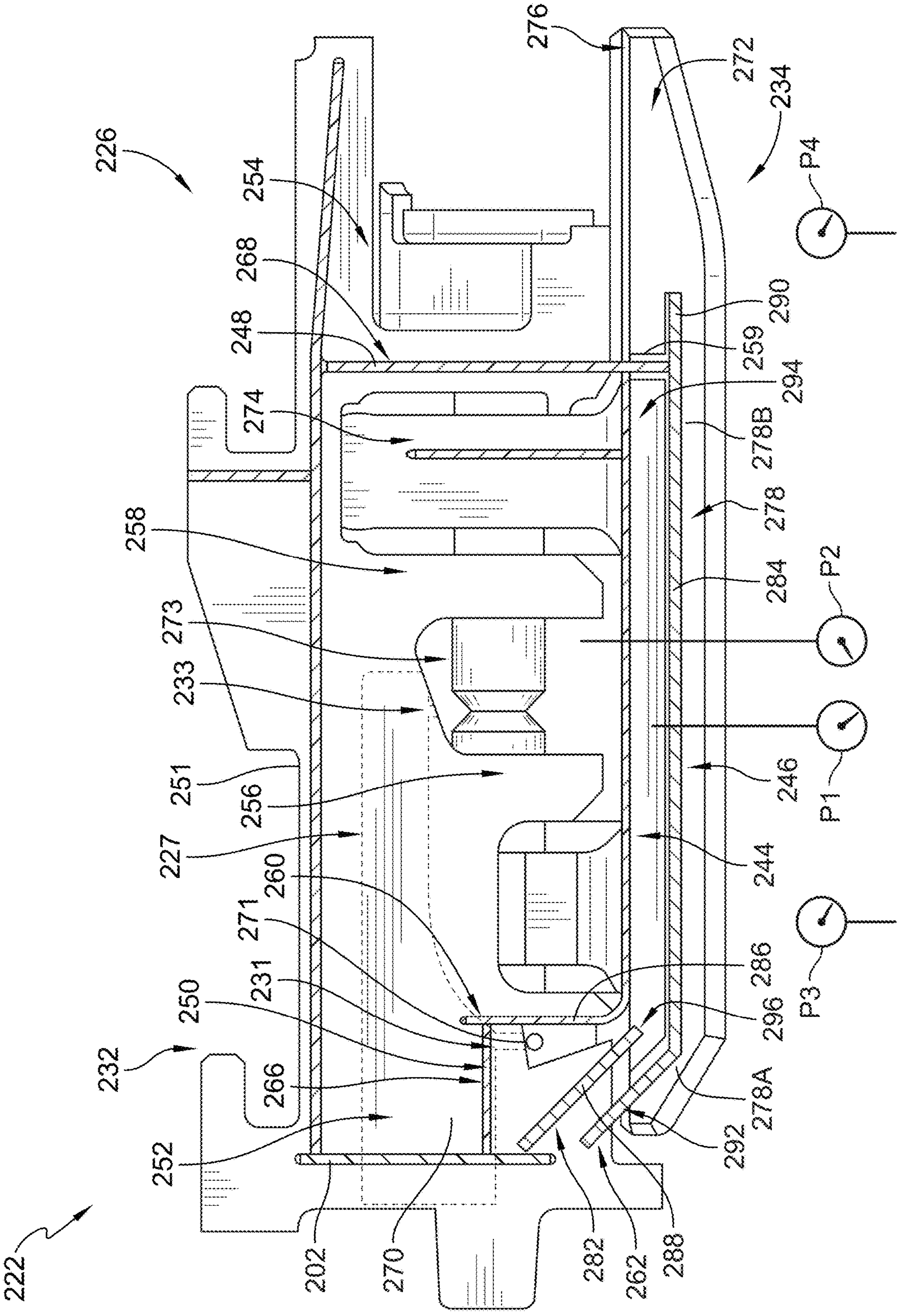
FIG. 8 is a cross-sectional view of a shroud segment of another embodiment of a turbine shroud assembly for use in the gas turbine engine of FIG. 1 showing a first strip seal extends axially along a radial outer surface of a shroud wall of a blade track segment, a second strip seal extends circumferentially into a recess formed in the shroud wall, a third strip seal extends radially outward from the second strip seal near an aft terminal end of the first strip seal and into a carrier segment, a fourth strip seal extends into the carrier segment adjacent a forward terminal end of the first strip seal, and a fifth strip seal extends between the carrier segment and the shroud wall of the blade track segment axially between the second strip seal and the first strip seal.

Another embodiment of a turbine shroud assembly 222 in accordance with the present disclosure is shown in FIG. 8. The turbine shroud assembly 222 is substantially similar to the turbine shroud assembly 22 shown in FIGS. 1-7 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

A first carrier segment 232 of a first shroud segment 226 includes a first outer wall 251, a first flange 252, a second flange 254, a third flange 256, and a fourth flange 258 as shown in FIG. 8. The first flange 252 is formed to include a first slot 260, a second slot 262, a third slot 266, and a fourth slot 282. The first slot 260 extends circumferentially into the first flange 252 and is shaped to receive a portion of a first strip seal 244 therein. The second slot 262 extends circumferentially into the first flange 252 and is located axially forward of the first slot 260. Illustratively, the second slot 262 extends radially outward and axially forward from a radial inner surface of the first flange 252 and is shaped to receive a portion of a second strip seal 246 therein. The third slot 266 extends circumferentially into the first flange 252 from a circumferential face 270 of the first flange 252 that faces toward a second carrier segment. The third slot 266 is shaped to receive a portion of a fourth strip seal 250 therein. The fourth slot 282 extends circumferentially into the first flange 252 and is located axially between the second slot 262 and the first slot 260. Illustratively, the fourth slot 282 extends radially outward and axially forward from the radial inner surface of the first flange 252 and is shaped to receive a portion of a fifth strip seal 288 therein.

The second flange 254 is formed to include a fifth slot 268 that extends circumferentially into the second flange 254 and is shaped to receive a portion of a third strip seal 248 therein. The first carrier segment 332 is formed to include an air passageway 227 as shown in FIG. 8. The air passageway 227 includes a first air passage 231 and a second air passage 233. The first air passage 231 opens into a seal cavity 294. The first air passage 231 extends through the first flange 252 of the first carrier segment 232 to the circumferential face 270 thereof. An outlet 271 of the first air passage 231 is formed on the circumferential face 270 of the first flange 252. As shown in FIG. 8, in some embodiments, the first flange 252 includes a recessed portion that is recessed relative to the circumferential face 270. The outlet 271 is formed on the recessed portion, and the recessed portion aids in directing the air radially inwardly from the outlet 271 into the seal cavity 294. The second air passage 233 opens into a carrier plenum 273.

The first blade track segment 234 includes a first shroud wall 272 and a first attachment feature 274 that extends radially outward from the first shroud wall 272 as shown in FIG. 8. The first shroud wall 272 is formed to include a first recess 278 extending circumferentially into the first shroud wall 272 to receive the second strip seal 246. The first recess 278 of the first shroud wall 272 includes a radially-extending portion 278A that extends radially inward and axially aft from a first radial outer surface 276 of the first shroud wall 272 and an axially-extending portion 278B that extends axially aft from the radially-extending portion 278A. The radially-extending portion 278A has a width that is greater than a width of the second slot 262. The first shroud wall 272 is formed to include a first groove 259 and a second groove 296. The first groove 259 extends radially outward from the axially-extending portion 278B of the first recess 278. The second groove 296 extends axially aft and radially inward into the first shroud wall 272 of the first blade track segment 234 from the first radial outer surface 276 thereof. The second groove 296 receives a portion of the fifth strip seal 288 therein.

The plurality of seals 230 includes the first strip seal 244, the second strip seal 246, the third strip seal 248, the fourth strip seal 250, and the fifth strip seal 288 shown in FIG. 8. The first strip seal 244 includes a body segment 284 and a forward segment 286. The body segment 284 extends axially along the first radial outer surface 276 of the first shroud wall 272 between a first end and a second end thereof opposite the first end. The forward segment 286 is coupled to the first end of the body segment 284 and extends radially outward from the first end of the body segment 284 into the first slot 260 formed in the first flange 252.

The second strip seal 246 extends circumferentially into each of the first recess 278 of the first blade track segment 34 and a second recess of the second blade track segment. The second strip seal 246 includes an axial segment 290 and a forward radial segment 292 as shown in FIG. 8. The axial segment 290 extends axially between a first end and a second end thereof opposite the first end. The forward radial segment 292 is coupled with the first end of the axial segment 290 to extend axially forward and radially outward from the first end of the axial segment 290 into the second slot 262 of the first flange 252 of the first carrier segment 232. Because the width of the second slot 262 is less than the width of the radially-extending portion 278A of the first recess 278, the second strip seal 246 does not bind in the first blade track segment 234 or impart stress to the first blade track segment 234. The relatively small width of the second slot 262 also helps to prevent flutter of the second strip seal 246 as the second strip seal 246 is pinched by the first carrier segment 232 within the second slot 262. The second end of the axial segment 290 terminates in an axial direction.

The third strip seal 248 extends circumferentially into the fifth slot 268 of the first carrier segment 232, the first groove 259 of the first shroud wall 272 of the first blade track segment 234, a fifth slot of the second carrier segment, and a second groove of the second blade track segment. The fourth strip seal 250 extends circumferentially between the third slot 266 of the first carrier segment 232 and the third slot of the second carrier segment. Illustratively, the fourth strip seal 250 extends straight axially aft from the strip seal 202. The fourth strip seal 250 is located radially outward of the forward radial segment 292 of the second strip seal 246 and axially forward of the forward segment 286 of the first strip seal 244. The outlet 271 of the first air passage 231 is located radially inward of the fourth strip seal 250.

The fifth strip seal 288 extends between the first carrier segment 232 and the first blade track segment 234 as shown in FIG. 8. The fifth strip seal 288 extends into the fourth slot 282 of the first carrier segment and into the second groove 296 of the first shroud wall 272. The fifth strip seal 288 is located radially inward of the fourth strip seal 250 and axially between the second strip seal 246 and the first strip seal 244. A portion of the air in the seal cavity 294 may leak out of the seal cavity 294 axially forward and radially outward between the forward radial segment 292 of the second strip seal 246 and the fifth strip seal 288.

The first strip seal 244 and the second strip seal 246 cooperate to define the seal cavity 294 radially therebetween as shown in FIG. 8. The third strip seal 248 closes an aft end of the seal cavity 294, and the fourth strip seal 250 closes a forward end of the seal cavity 294. Air is directed through the first air passage 231 and into the seal cavity 294. The fifth strip seal 288 and the forward segment 286 of the first strip seal 244 direct the air radially inward from the outlet 271, and the body segment 284 and the axial segment 290 direct the air axially aft through the seal cavity 294. The air that is directed into the seal cavity 294 has a first pressure P1. The air in the carrier plenum 273 has a second pressure P2 that is greater than the first pressure P1. As shown in FIG. 8, the gases in the gas path have a third pressure P3 near an axial forward end of the first blade track segment 234. The third pressure P3 is similar to the first pressure P1 and less than the second pressure P2. The gases in the gas path near an axial aft end of the first blade track segment 234 have a fourth pressure P4 that is less than the third pressure P3 caused by work being extracted from the gases by the blades. Due to the pressure differential between the first pressure P1 and the second pressure P2, the first strip seal 244 is urged radially inward against the radial outer surfaces 276 of the blade track segments 234. The pressure drop in the gas path between the third pressure P3 and the fourth pressure P4 urges the second strip seal 246 radially inwardly within the recesses 278. Due to the pinched forward radial segment 292 of the second strip seal 246, fluttering at a forward end of the second strip seal 246 is not as prevalent as fluttering at an aft end of the second strip seal 246. Thus, the pressure drop (to the fourth pressure P4) at the axial aft end of the first blade track segment 234 helps to force the axial segment 290 of the second strip seal 246 radially inwardly.

Figure 9:
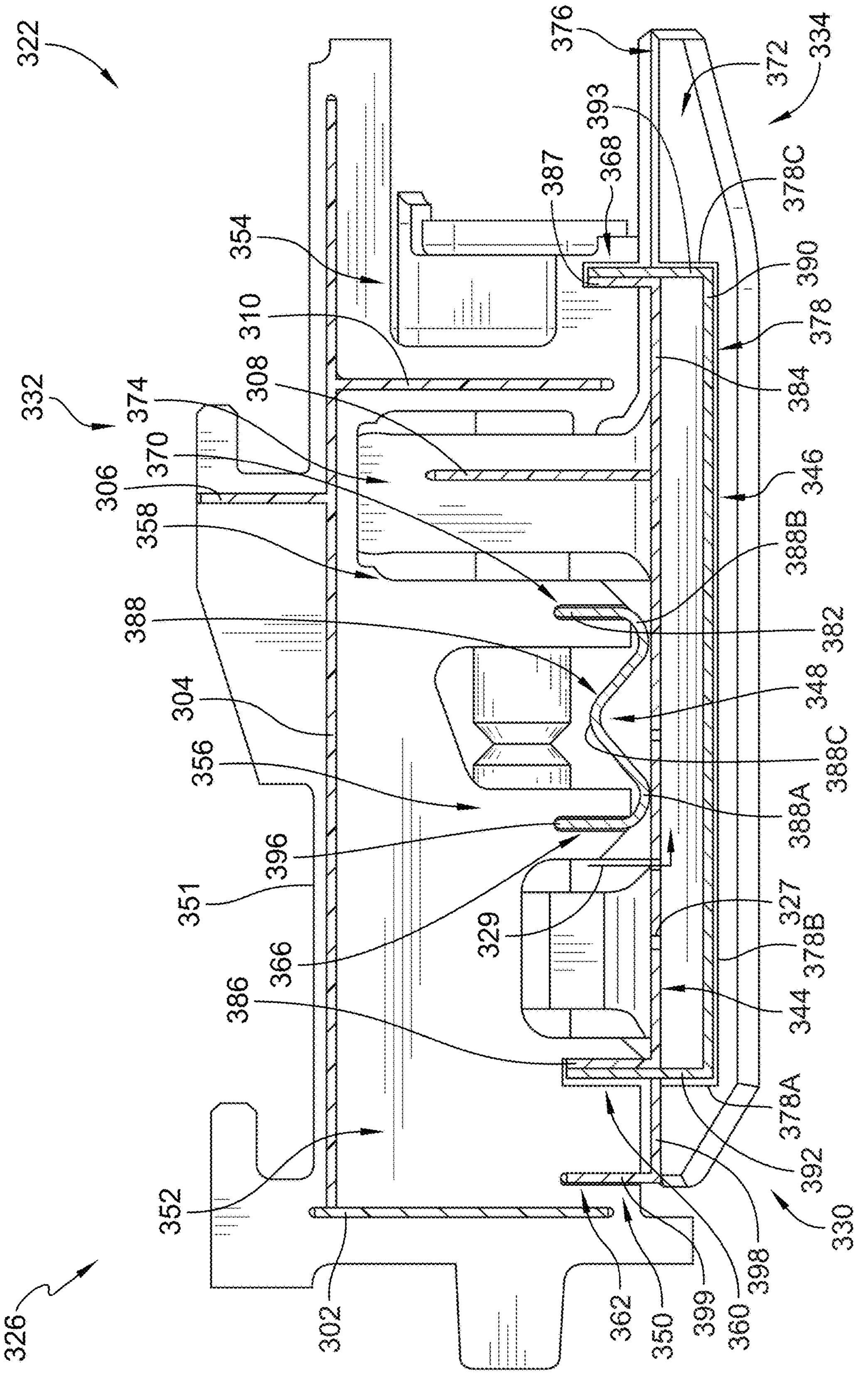
FIG. 9 is a cross-sectional view of a shroud segment of another embodiment of a turbine shroud assembly for use in the gas turbine engine of FIG. 1 showing a first strip seal extends axially along a radial outer surface of a shroud wall of a blade track segment, a second strip seal extends circumferentially into a recess formed in the shroud wall, and a third strip seal extends axially along the radial outer surface and into the carrier segment, the third strip seal located axially forward of the first and second strip seals.

Another embodiment of a turbine shroud assembly 322 in accordance with the present disclosure is shown in FIG. 9. The turbine shroud assembly 322 is substantially similar to the turbine shroud assembly 22 shown in FIGS. 1-7 and described herein. Accordingly, similar reference numbers in the 300 series indicate features that are common between the turbine shroud assembly 22 and the turbine shroud assembly 322. The description of the turbine shroud assembly 22 is incorporated by reference to apply to the turbine shroud assembly 322, except in instances when it conflicts with the specific description and the drawings of the turbine shroud assembly 322.

A first carrier segment 332 of a first shroud segment 326 includes a first outer wall 351, a first flange 352, a second flange 354, a third flange 356, and a fourth flange 358 as shown in FIG. 9. The first flange 352 is formed to include a first slot 360 and a second slot 362. The first slot 360 extends circumferentially into the first flange 352 and is shaped to receive a portion of a first strip seal 344 and a portion of a second strip seal 346 therein. Illustratively, the first slot 360 extends radially outward into the first flange 352 from a radial inner surface of the first flange 352. The second slot 362 extends circumferentially into the first flange 352 and is located axially forward of the first slot 360. Illustratively, the second slot 362 extends radially outward from the radial inner surface of the first flange 352 and is shaped to receive a portion of a third strip seal 350 therein. The second flange 354 is formed to include a third slot 368 that extends circumferentially into the second flange 354 and is shaped to receive a portion of the first strip seal 344 and a portion of a second strip seal 346 therein. The third flange 356 is formed to include a fourth slot 366. The fourth slot 366 extends radially outward into the third flange 356 to receive a portion of a damping segment 348 therein. The fourth flange 358 is formed to include a fifth slot 370 that extends radially outward into the fourth flange 358. The fifth slot 370 receives another portion of the damping segment 348 therein.

A first blade track segment 334 includes a first shroud wall 372 and a first attachment feature 374 that extends radially outward from the first shroud wall 372 as shown in FIG. 9. A circumferential end of the first shroud wall 372 is formed to include a first recess 378 extending circumferentially into the first shroud wall 372 to receive the second strip seal 346 therein. The first recess 378 of the first shroud wall 372 includes a first radially-extending portion 378A that extends radially inward from a first radial outer surface 376 of the first shroud wall 372, an axially-extending portion 378B that extends axially aft from the first radially-extending portion 378A, and a second radially-extending portion 378C that extends radially outward to the first radial outer surface 376 from the axially-extending portion 378B. Illustratively, each of the radially-extending portions 378A, 378C extend straight radially outward from the axially-extending portion 378B. A second carrier segment and a second blade track segment of a second shroud segment are similar to the first carrier segment 332 and the first blade track segment 334.

A plurality of seals 330 included in the turbine shroud assembly 322 includes the first strip seal 344, the second strip seal 346, the damping segment 348, and the third strip seal 350 shown in FIG. 9. The first strip seal 344 includes a body segment 384, a forward segment 386, and an aft segment 387. The body segment 384 extends axially along the first radial outer surface 376 of the first shroud wall 372 and a second radial outer surface of a second shroud wall between a first end and a second end thereof opposite the first end. The forward segment 386 is coupled to the first end of the body segment 384 and extends radially outward from the first end of the body segment 384 into the first slot 360 formed in the first flange 352 of the first carrier segment 332 and a slot formed in a fifth flange of the second carrier segment. In some embodiments, the forward segment 386 extends straight radially outward from the body segment 384. The aft segment 387 is coupled to the second end of the body segment 384 and extends radially outward from the second end of the body segment 384 into the third slot 368 formed in the second flange 354 of the first carrier segment 332 and a slot formed in a sixth flange of the second carrier segment. In some embodiments, the aft segment 387 extends straight radially outward from the body segment 384.

The second strip seal 346 extends circumferentially into each of the first recess 378 of the first blade track segment 334 and a second recess of the second blade track segment. The second strip seal 346 includes an axial segment 390, a forward radial segment 392, and an aft radial segment 393 as shown in FIG. 9. The axial segment 390 extends axially between a first end and a second end thereof opposite the first end. The forward radial segment 392 is coupled with the first end of the axial segment 390 to extend radially outward from the first end of the axial segment 390 into the first slot 360. The forward radial segment 392 is located axially forward of and abuts the forward segment 386 of the first strip seal 344. In some embodiments, the forward radial segment 392 extends straight radially outward from the axial segment 390. The aft radial segment 393 is coupled with the second end of the axial segment 390 to extend radially outward from the second end of the axial segment 390 into the third slot 368. The aft radial segment 393 is located axially aft of and abuts the aft segment 387 of the first strip seal 344. In some embodiments, the aft radial segment 393 extends straight radially outward from the axial segment 390.

In some embodiments, the forward radial segment 392 and the forward segment 386 are located in different slots formed in the first flange 352. In some embodiments, the aft radial segment 393 and the aft segment 387 are located in different slots formed in the second flange 354.

The axial segment 390 of the second strip seal 346 is located in the axially-extending portion 378B of the first recess 378 as shown in FIG. 9. The forward radial segment 392 extends from the first radially-extending portion 378A of the first recess 378 into the slots 360 formed in the first flange 352 and the fifth flange of the carrier segments 332. The aft radial segment 393 extends from the second radially-extending portion 378C of the first recess 378 into the slots 362 formed in the first flange 352 and the fifth flange of the carrier segments 332.

The third strip seal 350 includes an axial portion 398 and a radial portion 399 as shown in FIG. 9. The axial portion 398 extends along the first radial outer surface 376 of each of the blade track segments 334 and is located axially forward of and abutting the forward radial segment 392 of the second strip seal 346. The radial portion 399 extends radially outward from a forward end of the axial portion 398 and into the second slot 362 of the first carrier segment 332 to axially capture the third strip seal 350 and prevent axial movement as shown in FIG. 9. Illustratively, the third strip seal 350 is L-shaped.

The damping segment 348 engages each of the first strip seal 344, the first carrier segment 332, and the second carrier segment to urge the first strip seal 344 radially inward against the first radial outer surface 376 of the first shroud wall 372 and the second radial outer surface of the second shroud wall. The damping segment 348 extends along a curvilinear path as shown in FIG. 9. In the illustrative embodiment, the curvilinear path forms a w-shape. The damping segment 348 is defined by a first radially-extending portion 396, a second radially-extending portion 382, and a curved intermediate portion 388 that extends between and interconnects the first radially-extending portion 396 and the second radially-extending portion 382. The first radially-extending portion 396 forms the forward-most end of the damping segment 348, and the second radially-extending portion 382 forms the aft-most end of the damping segment 348.

The curved intermediate portion 388 extends between a forward end 388A and an aft end 388B thereof. The first radially-extending portion 396 extends axially forward and radially outward from the forward end 388A of the curved intermediate portion 388 and into the fourth slot 366 formed in the third flange 356 of the first carrier segment 332 and into a slot formed in the seventh flange of the second carrier segment. The second radially-extending portion 382 extends axially aft and radially outward from the aft end 388B of the curved intermediate portion 388 and into the fifth slot 370 formed in the fourth flange 358 of the first carrier segment 332 and a slot formed in the eighth flange of the second carrier segment. The curved intermediate portion 388, from the forward end 388A thereof, extends radially outward and axially aft to a peak 388C. From the peak 388C, the curved intermediate portion 388 extends radially inward and axially aft to the aft end 388B thereof. The peak 388C is located axially between the third flange 356 and the fourth flange 358 of the first carrier segment 332. The forward end 388A and the aft end 388B of the curved intermediate portion 388 each engage a radial outer surface of the body segment 384 of the first strip seal 344 as shown in FIG. 9.

The engagement between the first radially-extending portion 396 and the fourth slot 366 and the second radially-extending portion 382 and the fifth slot 370 applies a force to the body segment 384 of the first strip seal 344 as suggested in FIG. 9. The force urges the body segment 384 of the first strip seal 344 radially inward against the shroud walls 372. The urging of the body segment 384 of the first strip seal 344 against the shroud walls 372 dampens flutter movement of the first strip seal 344 relative to the first blade track segment 334 and the second blade track segment during use of the turbine shroud assembly 322.

In some embodiments, the body segment 384 of the first strip seal 344 is formed to include at least one hole 327 as shown in FIG. 9. The at least one hole 327 extends radially through the body segment 384 of the first strip seal 344 to direct cooling air 329 radially inwardly through the at least one hole 327 toward the second strip seal 346 to cool the second strip seal 346. In some embodiments, the body segment 384 is formed to include a plurality of holes 327 that are axially spaced apart from one another.

In some embodiments, the turbine shroud assembly 322 further includes strip seals 302, 304, 306, 308, 310 as shown in FIG. 9. Each of the strip seals 302, 304, 306, 310 extends into the first carrier segment 332 and the second carrier segment. The strip seal 308 extends into each of a second attachment flange of the first blade track segment 334 and a fourth attachment flange of the second blade track segment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, wherein the first shroud wall has a first radial outer surface and a first radial inner surface that defines the first portion of the gas path, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, wherein the second shroud wall has a second radial outer surface and a second radial inner surface that defines the second portion of the gas path, and a plurality of seals extending circumferentially into the first shroud segment and the second shroud segment to block gases from escaping the gas path radially between the first shroud segment and the second shroud segment, the plurality of seals including a first strip seal and a second strip seal, wherein the first strip seal extends axially along the first radial outer surface of the first shroud wall and the second radial outer surface of the second shroud wall to block the gases from passing radially between and beyond the first shroud wall and the second shroud wall, and the second strip seal extends circumferentially into the first shroud wall of the first blade track segment, the second shroud wall of the second blade track segment, the first carrier segment, and the second carrier segment.

2. The turbine shroud assembly of claim 1, wherein the second strip seal includes an axial segment and a forward radial segment, the axial segment extends axially between a first end and a second end thereof opposite the first end and circumferentially into the first shroud wall and the second shroud wall, and wherein the forward radial segment is coupled with the first end of the axial segment and extends radially outward from the first end of the axial segment and circumferentially into each of the first carrier segment and the second carrier segment.

3. The turbine shroud assembly of claim 1, wherein the first strip seal and the second strip seal cooperate to define a seal cavity radially therebetween.

4. The turbine shroud assembly of claim 3, wherein the first carrier segment is formed to include a first air passage that opens into the seal cavity and directs air through the first carrier segment and into the seal cavity to urge the second strip seal radially inward into engagement with the first shroud wall and the second shroud wall.

5. The turbine shroud assembly of claim 4, wherein the first carrier segment and the second carrier segment define a carrier plenum that extends circumferentially into the first carrier segment and the second carrier segment, wherein the first shroud wall of the first blade track segment, the second shroud wall of the second blade track segment, and the first strip seal cooperate to define an inner radial boundary of the carrier plenum, and at least one of the first carrier segment and the second carrier segment is formed to include a second air passage that directs the air into the carrier plenum to urge the first strip seal radially inward into engagement with the first shroud wall and the second shroud wall.

6. The turbine shroud assembly of claim 4, wherein the first carrier segment includes a first outer wall, a first flange that extends radially inward from the first outer wall, and a second flange axially spaced apart from the first flange and extending radially inward from the first outer wall, the first attachment feature of the first blade track segment extends into the first carrier segment and is located axially between the first flange and the second flange, and the first air passage is formed in the first flange.

7. The turbine shroud assembly of claim 4, wherein the first air passage extends between an inlet and an outlet, and the outlet opens circumferentially into the seal cavity from a circumferential face of the first carrier segment that faces toward the second carrier segment.

8. The turbine shroud assembly of claim 7, wherein the outlet is located axially between the first strip seal and the second strip seal.

9. The turbine shroud assembly of claim 3, wherein the plurality of seals includes a third strip seal that extends circumferentially into the first carrier segment, the first shroud wall of the first blade track segment, the second carrier segment, and the second shroud wall of the second blade track segment, and wherein the third strip seal extends radially outward from the second strip seal near an aft terminal end of the first strip seal to close an aft end of the seal cavity.

10. The turbine shroud assembly of claim 9, wherein the third strip seal and the second strip seal are integrally formed as a single, one-piece component.

11. The turbine shroud assembly of claim 9, wherein the plurality of seals includes a fourth strip seal that extends circumferentially between the first carrier segment and the second carrier segment, and wherein the fourth strip seal is located adjacent a forward terminal end of the first strip seal to close a forward end of the seal cavity.

12. The turbine shroud assembly of claim 11, wherein the first carrier segment is formed to include a first air passage that opens into the seal cavity and directs air through the first carrier segment and into the seal cavity to urge the second strip seal radially inward into engagement with the first shroud wall and the second shroud wall, and wherein the first air passage extends between an inlet and an outlet formed on a circumferential face of the first carrier segment that faces toward the second carrier segment, and wherein the outlet is located radially inward of the fourth strip seal and axially between the second strip seal and the first strip seal.

13. The turbine shroud assembly of claim 1, wherein the second strip seal includes an axial segment that extends axially along the first radial outer surface of the first shroud wall and the second radial outer surface of the second shroud wall and a forward radial segment coupled with the axial segment and extending radially outward from the axial segment into the first carrier segment.

14. The turbine shroud assembly of claim 13, wherein the first carrier segment is formed to include a first slot that extends radially outward from a radial inner surface of the first carrier segment to receive a radial outer end of the forward radial segment of the second strip seal therein, and wherein the first shroud wall of the first blade track segment is formed to include a second slot that receives a radial inner end of the forward radial segment of the second strip seal therein.

15. The turbine shroud assembly of claim 14, wherein the first slot has a first width and the second slot has a second width that is less than the first width.

16. The turbine shroud assembly of claim 14, wherein the first slot has a first width and the second slot has a second width that is greater than the first width.

17. The turbine shroud assembly of claim 1, wherein the plurality of seals includes a third strip seal that extends circumferentially into the first carrier segment, the first shroud wall of the first blade track segment, the second carrier segment, and the second shroud wall of the second blade track segment, the third strip seal extends radially outward from the second strip seal near an aft terminal end of the first strip seal, wherein the first carrier segment is formed to include a first slot that extends radially outward from a radial inner surface of the first carrier segment to receive a radial outer end of the third strip seal therein, and wherein the first shroud wall of the first blade track segment is formed to include a second slot that receives a radial inner end of the third strip seal therein, and wherein the first slot has a first width and the second slot has a second width that is greater than the first width.

18. A method comprising:

assembling a first shroud segment by coupling a first blade track segment with a first carrier segment to support the first blade track segment radially inward of the first carrier segment, assembling a second shroud segment by coupling a second blade track segment with a second carrier segment to support the second blade track segment radially inward of the second carrier segment, locating a first strip seal on a first radial outer surface of a first shroud wall of the first blade track segment and a second radial outer surface of a second shroud wall of the second blade track segment, locating an axial segment of a second strip seal in the first shroud wall of the first blade track segment and the second shroud wall of the second blade track segment to locate the axial segment of the second strip seal radially inward of the first strip seal, locating a forward radial segment of the second strip seal in the first shroud wall, the second shroud wall, the first carrier segment, and the second carrier segment, and directing air through a first air passage formed in the first carrier segment and into a seal cavity formed between the first strip seal and the second strip seal.

19. The method of claim 18, further comprising urging the second strip seal radially inward into engagement with the first shroud wall and the second shroud wall due to flow path gases located radially inward of the second strip seal having a second pressure that is less than a first pressure of the air in the seal cavity.

20. The method of claim 19, further comprising urging the first strip seal radially inward against the first radial outer surface and the second radial outer surface due to plenum gases located radially outward of the first strip seal having a third pressure that is greater than the first pressure of the air in the seal cavity.

* * * * *